Figures 1, 2:
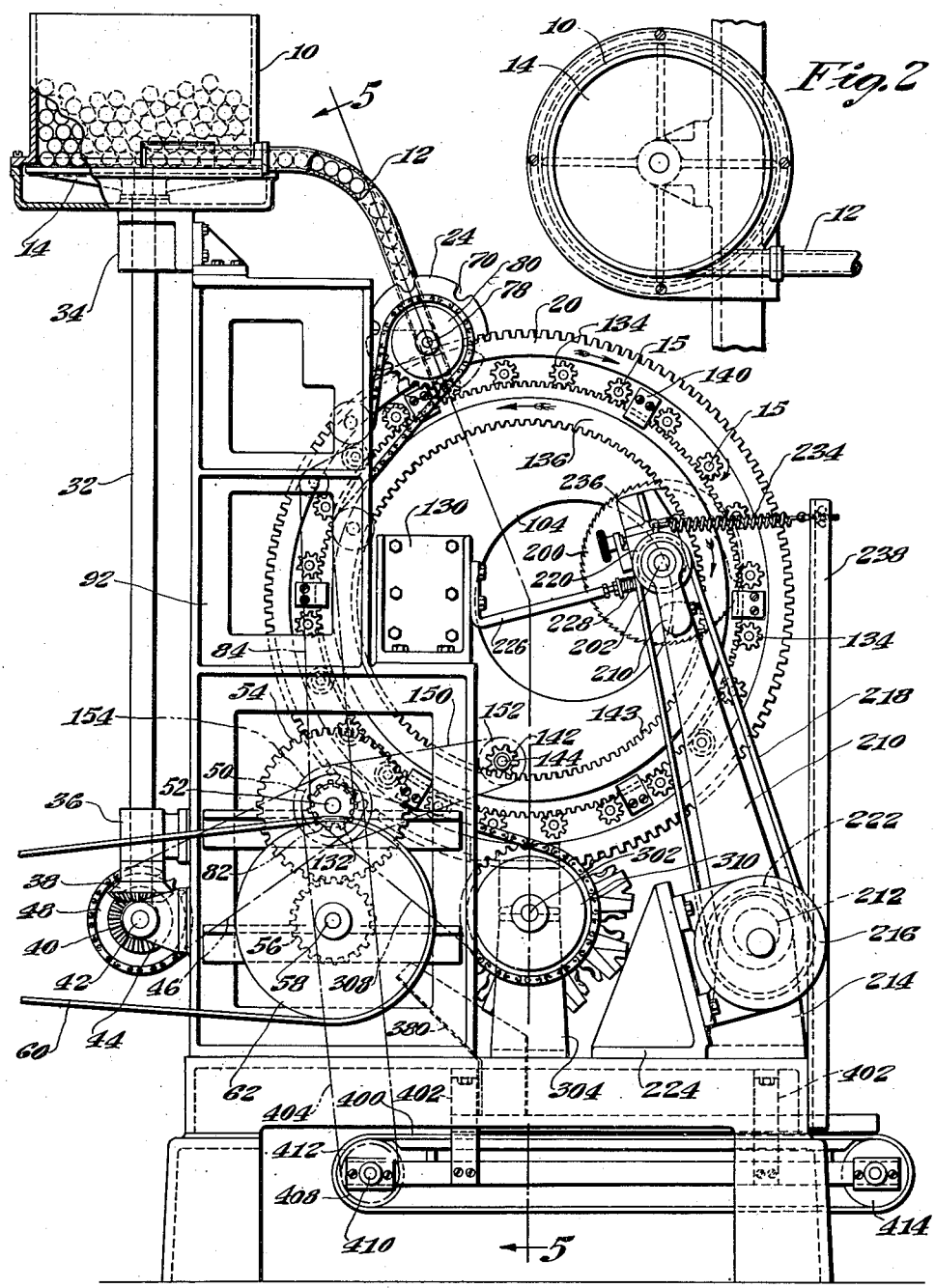

Jan. 12, 1937.  S. B. FIELD  2,067,566
APPARATUS FOR AND METHOD OF OPENING NUTS
Filed Jan. 27, 1934  5 Sheets-Sheet 1

INVENTOR
Samuel B. Field
BY J. Stanley Churchill
ATTORNEY

Jan. 12, 1937. S. B. FIELD 2,067,566
APPARATUS FOR AND METHOD OF OPENING NUTS
Filed Jan. 27, 1934 5 Sheets-Sheet 2
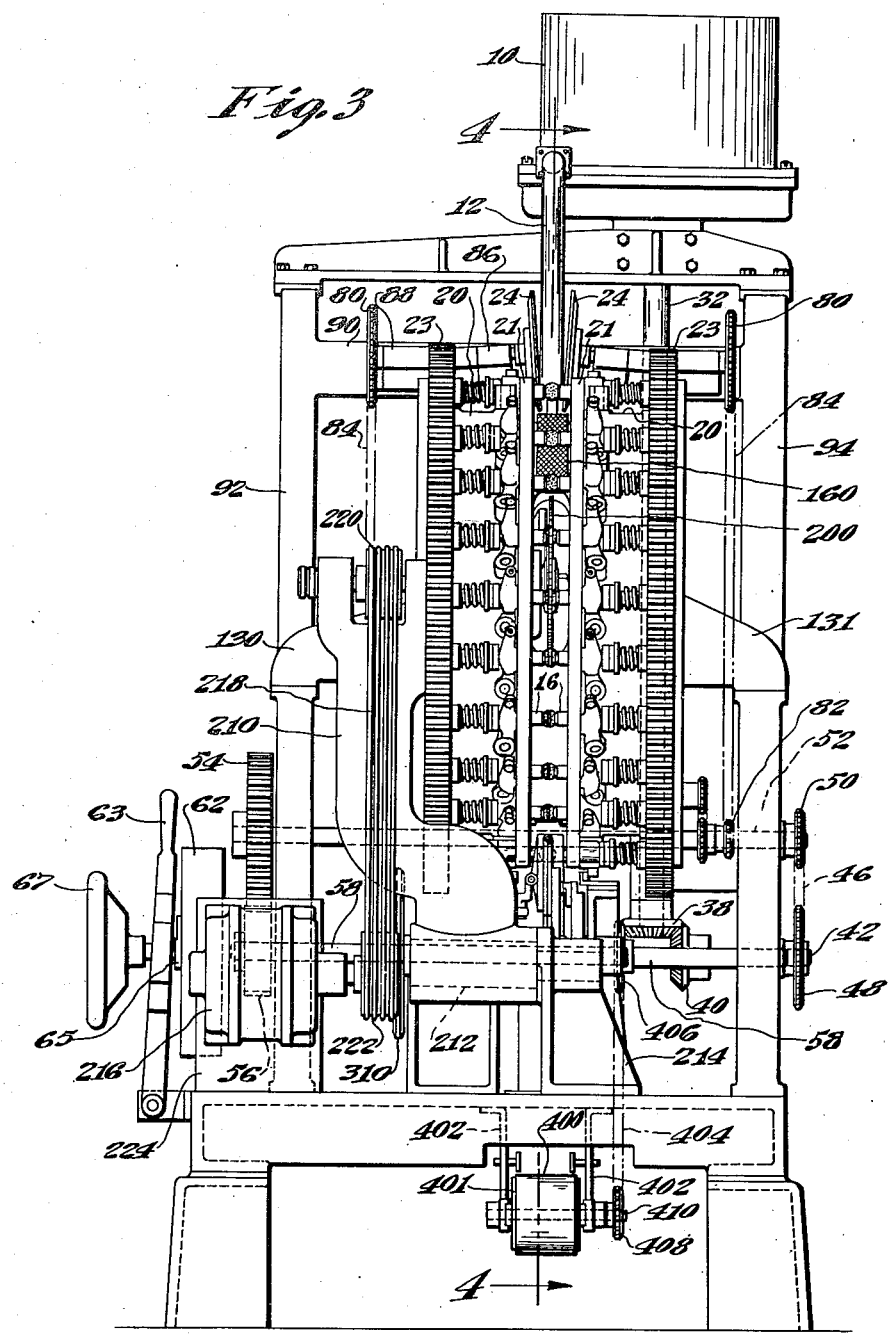
INVENTOR
Samuel B. Field
BY J. Stanley Churchill
ATTORNEY

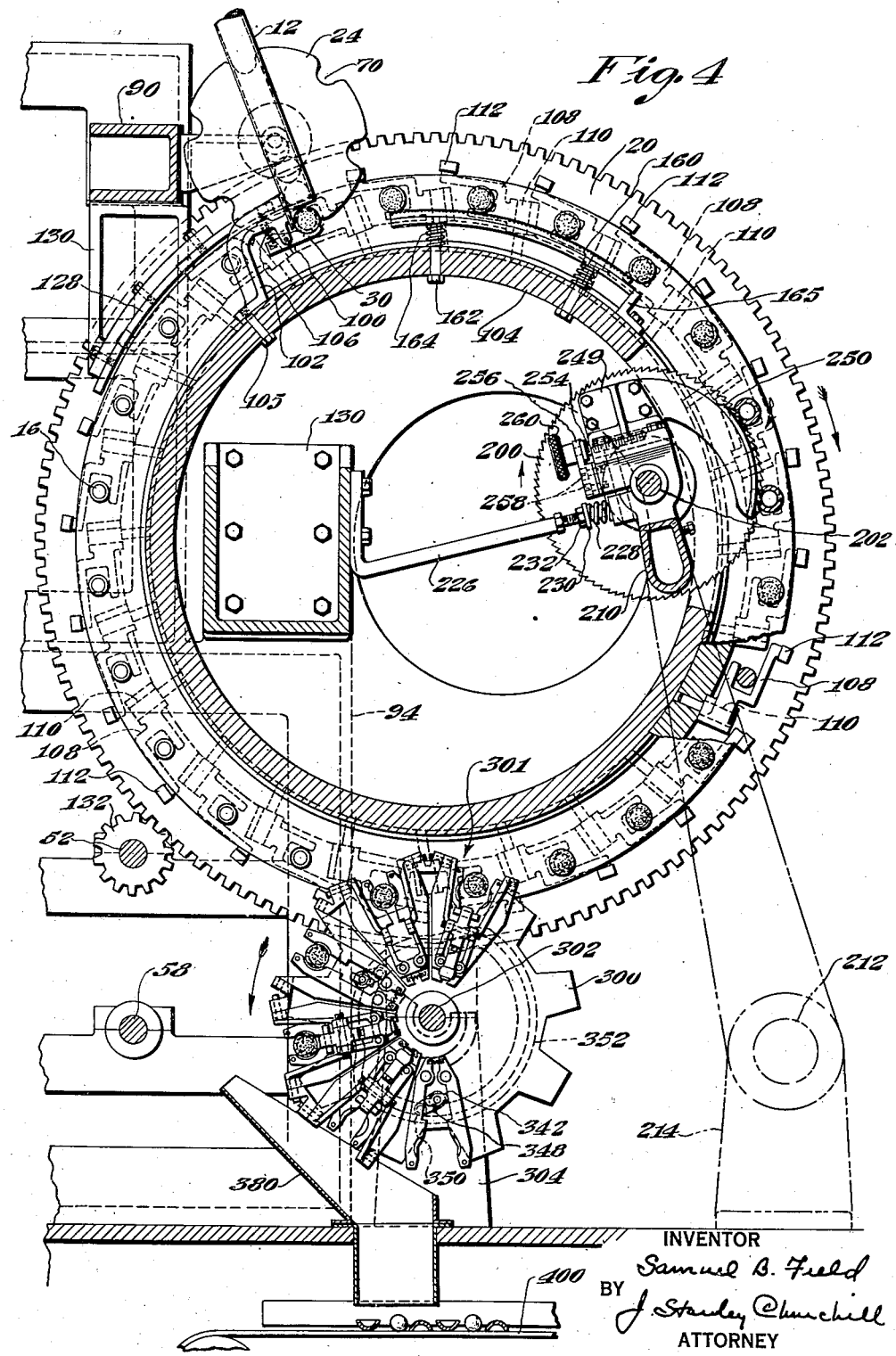

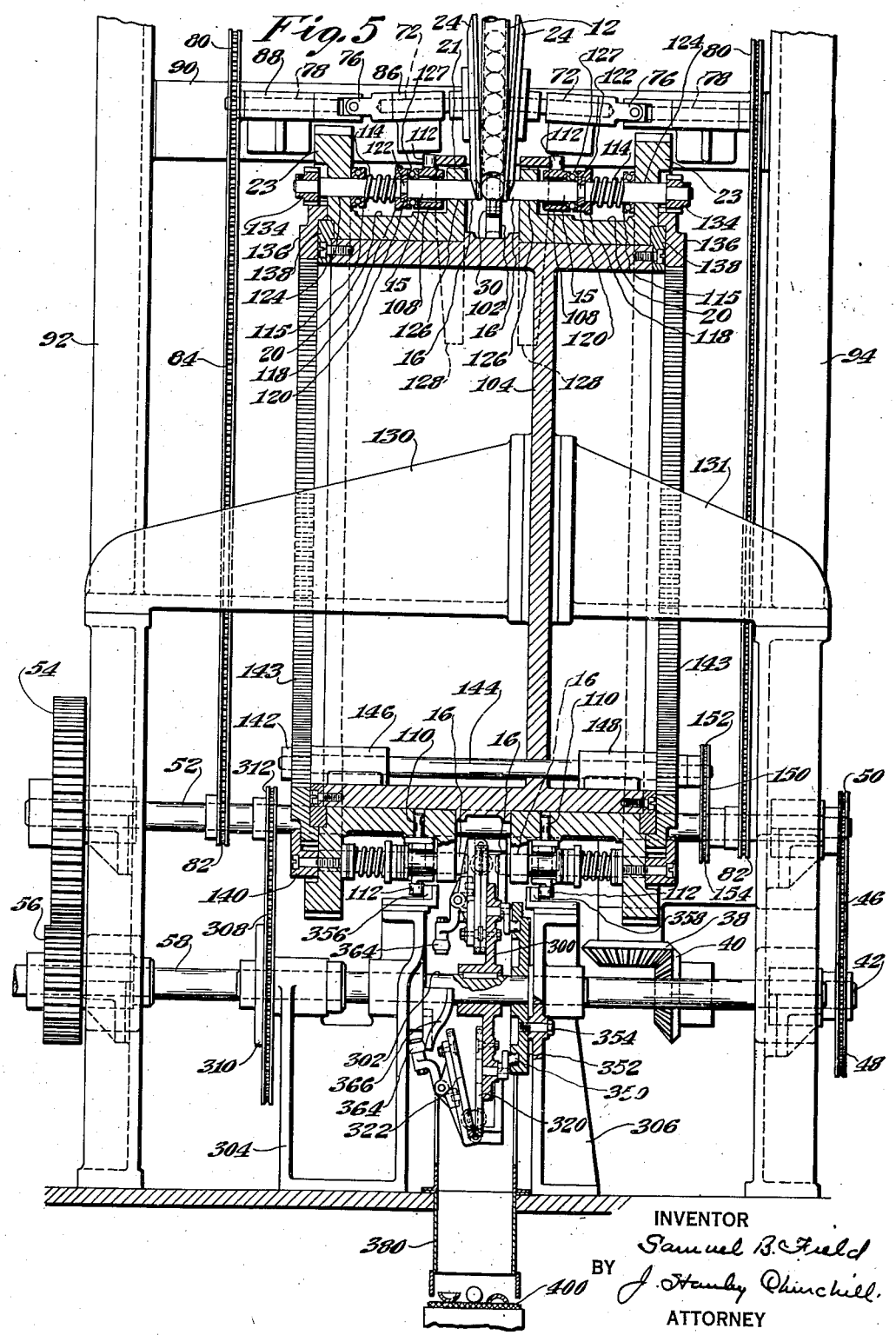

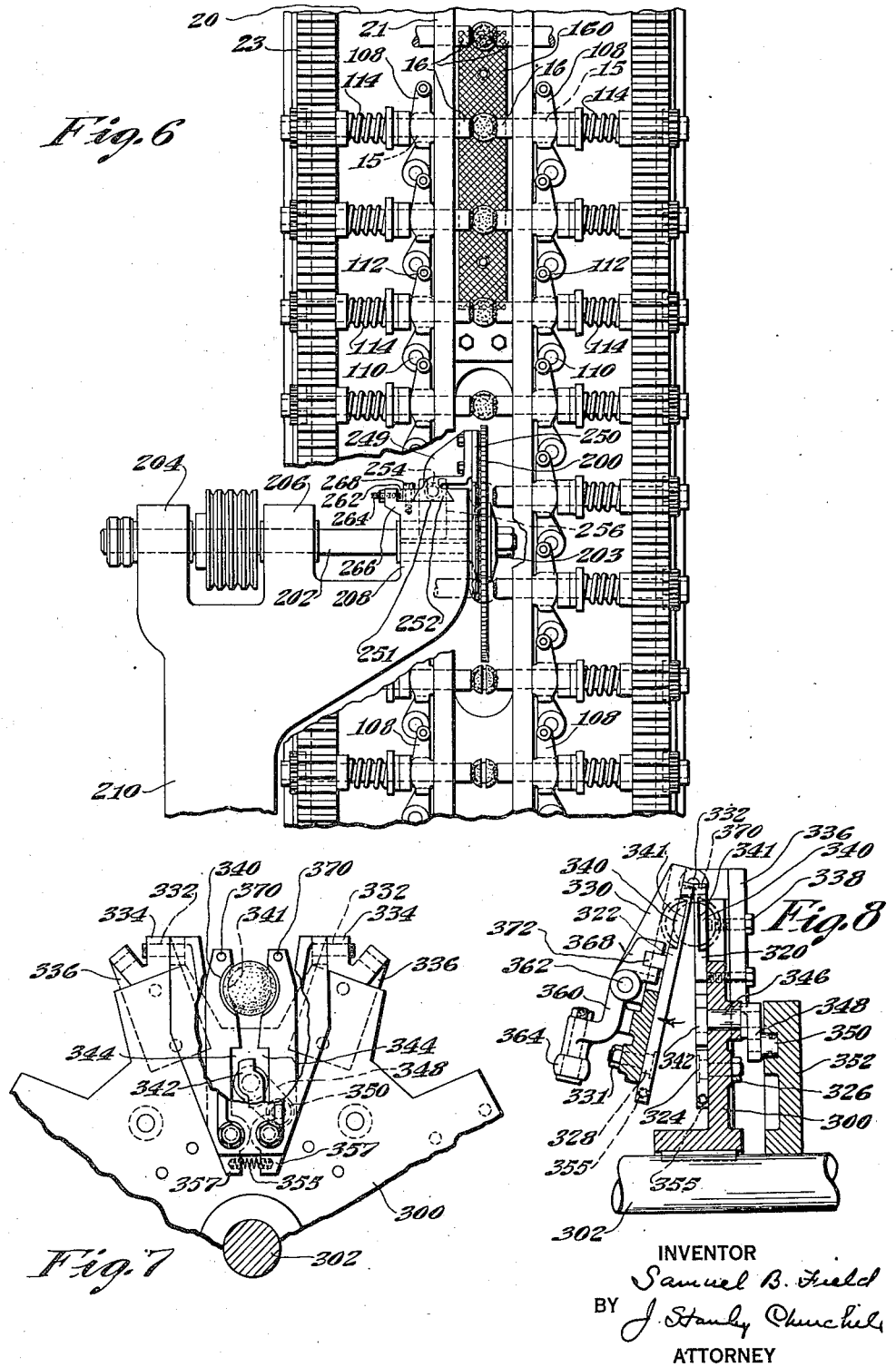

Patented Jan. 12, 1937

2,067,566

UNITED STATES PATENT OFFICE 2,067,566

APPARATUS FOR AND METHOD OF OPENING NUTS

Samuel B. Field, Holbrook, Mass., assignor to Hawaiian Macadamia Nut Company Limited, Honolulu, Hawaii, a corporation of the Territory of Hawaii Application January 27, 1934, Serial No. 708,617

8 Claims. (Cl. 146—10)

This invention relates to apparatus for and to a method of opening nuts.

In general, the invention has for an object to provide novel and efficient apparatus for and also a method of opening nuts by which large quantities of the nuts may be opened in a rapid, economical and efficient manner to facilitate the separation of the kernels from the shells with minimum injury to the kernels.

A further and more specific object of the invention is to provide a novel and highly efficient apparatus for and also a method of opening those nuts having hard shells such as the Macadamia nuts which grow in the Hawaiian Islands.

With these objects in view and such others as may hereinafter appear, the invention consists in the apparatus, in the method and in the various structures, arrangements and combinations of parts hereinafter described and particularly defined in the claims at the end of this specification.

In the drawings illustrating the preferred embodiment of the invention, Fig. 1 is a side elevation of the complete machine; Fig. 2 is a plan view of the feeding hopper; Fig. 3 is a front elevation of the complete machine; Fig. 4 is a sectional side elevation on line 4—4 of Fig. 3; Fig. 5 is a sectional front elevation of the line 5—5 of Fig. 1; Fig. 6 is a side elevation of the saw together with a developed view of the nut supporting drum; Fig. 7 is an enlarged detail in front elevation of one of the splitting units partly broken away; and Fig. 8 is a sectional side elevation thereof.

In general, the different features of the present invention may be embodied in an automatic machine for removing the shells from nuts, and particularly from nuts of the type of Macadamia nuts which are characterized by an unusually hard shell. In the preferred embodiment of the invention, provision is made for cutting and preferably sawing a groove in the shell of the nut and thereafter spreading apart the sections of the nut by spreading members inserted into the groove thus formed in the shell. In the illustrated machine provision is made for feeding the nuts from a bulk supply into operative relation to successive pairs of nut holding members and for thereafter moving the nuts thus held into the path of a rotary cutting member, preferably a rotating saw, by which a cut or groove is formed in the shell of the nut. Thereafter provision is made for spreading the nuts along the cut or groove, thus effecting the opening of the nut and enabling the kernel to be removed with minimum liability of injury thereto. In the illustrated machine various operations are performed automatically and in a rapid, efficient and economical manner.

Referring to the drawings illustrating the preferred embodiment of the invention, and particularly to Figs. 1, 4 and 5, provision is made for withdrawing nuts from a bulk supply in a hopper 10 and, as herein shown, the nuts are fed from the hopper 10 through a feeding tube 12 by the centrifugal action of a rotating disc 14 which forms the bottom of the hopper 10. The disc 14 is continuously rotated and, as illustrated herein, is securely mounted at the upper end of a vertical shaft 32, which is journalled in bearings 34 and 36 fastened to the machine frame. The lower end of the vertical shaft 32 is provided with a bevel gear 38 fast thereon which meshes with a bevel gear 40 fixed to a horizontal shaft 42. The shaft 42, journalled in suitable bearings 44, is arranged to be driven by a sprocket chain 46 which runs over a sprocket 48, fast on the shaft 42 and a sprocket 50 fast on an intermediate shaft 52. The shaft 52 is provided with a gear 54 fast thereon which is driven by a pinion 56 fast on a shaft 58. The shaft 58 is driven by a motor, not shown, through the belt 60 and pulley 62, the latter being connected to the shaft 58 by a clutch 65 of any suitable or well known construction. As shown in Fig. 3, a clutch handle 63 is provided to throw the clutch 65. A handwheel 67 is provided to enable the machine to be turned over by hand if found desirable.

The feeding tube 12 depends from the side of the hopper 10 and guides the nuts to a pair of gripping chucks 16, a plurality of which are mounted on revolving drums 20. In order to control the feeding of the nuts to the gripping chucks in definite timed relation to the revolving drums 20, and in order to align the nuts in proper relation to the gripping chucks 16, a pair of revolving discs 24 are provided to cooperate with an aligning member 30 stationed under the lower end of the feeding tube 12. The faces of these revolving discs 24 are mounted at a slight angle to each other forming a wedge-shaped space between them into which the feeding tube 12 extends. The discs have equally spaced openings 70 around the periphery thereof which permit the nuts to drop down from the tube 12 and into the aligning member 30 in timed relation to the arrival of the gripping chucks 16. The discs 24 are mounted on shafts 72 and are arranged to be driven through universal joints 76, one member of which is fast to the shaft 72, and the other member secured to a shaft 78. The shaft 78 is provided with a sprocket 80 fast thereon and is arranged to be driven by a sprocket 82, fast on the shaft 52, through a chain 84. The shafts 72 and 78 are suitably journaled in bearings 86 and 88, respectively, which are fastened to a tie piece 90, extending between the side members 92 and 94 which form a part of the machine frame. The aligning member 30 is pivoted on a pin 100 secured in a bracket 102 which is fastened to a stationary drum 104 by a bolt 105. One end of the member 30 is cup-shaped to receive a nut and the other end is arranged to hold one end of a compression spring 106. The other end of the spring 106 is held in a drilled out portion of the bracket 102. With this arrangement the nut is yieldingly held in proper alignment, to permit the gripping chucks 16 to grasp the nut and carry it around with the rotating drums 20, as will be described. The ends of the chucks 16 which engage the nuts are preferably cup-shaped to conform to the curvature of the nuts and it may sometimes be desired to cut saw teeth, in the ends of the chucks to grip the nuts, as indicated in Fig. 6.

Referring now to Figs. 1 and 5, a plurality of the gripping chucks 16 are arranged at equally spaced intervals in the drums 20 and provision is made for opening and closing the gripping chucks 16. As herein shown in Figs. 4, 5 and 6, a yoked lever 108 is provided for each chuck to fit around a portion of the chuck shaft 15. The lever 108 is mounted on a stud 110 fast in the drum 20 and is provided at its outer end with a cam roll 112. The inner face of the yoked lever bears against a flange 21 of the drum 20 and is yieldingly held in this position by a compression spring 114. The compression spring is coiled around the chuck shaft between a roller thrust bearing 115, which bears against the flange 23 of the drum 20, and a collar 118 held fast on the chuck shaft 15 by a split collar 120 which fits in a groove 122 in the chuck shaft 15, as clearly shown in Fig. 5. The chuck shaft 15 is mounted in the drum 20 in bearings 124 and 126 in flanges 23 and 21, respectively.

A second thrust collar 127 is mounted on the chuck shaft 15 between the collar 118 and the outer face of the lever 108. In order to open the chucks to receive a nut, stationary cams 128 are provided which cooperate with the cam rollers 112 on the levers 108. The stationary cams are mounted on brackets 130 which are fastened to the underside of the tie piece 90, as illustrated in Fig. 4.

The drums 20 are arranged to rotate on and are supported by the stationary drum 104. The drum 104 is supported by brackets 130 and 131 which are fastened to the side frames 92 and 94, respectively. The drums 20 are provided with gear teeth on the flanges 23 around the periphery thereof and are arranged to be driven by pinions 132 fast on the shaft 52.

In order to rotate the chucks and, consequently, the nuts on their own axes while traveling around with the drum 20, pinions 134 fast on the outer ends of the chuck shaft 15 are provided to mesh with a ring gear 136. The ring gear 136 is in turn driven in the opposite direction from that of the drums 20 as shown by arrows in Fig. 1, to further accelerate the speed of rotation of the chucks 16. The ring gear is mounted to turn on the drum 20 by the provision of a circular bearing 138 fastened to the side thereof. The ring gear is held in place by retaining members 140 also fastened to the drum 20. In order to rotate the ring gear 136 a pinion 142 is provided on a shaft 144, journalled in bearings 146 and 148 secured to the stationary drum 104. The pinion 142 meshes with internal gear teeth 143 cut in the ring gear 136 and is arranged to be driven by a chain 150 which runs over a sprocket 152 fast on the shaft 144 and sprocket 154 fast on the shaft 52.

From the description thus far, it will be observed that the nuts are fed from the hopper 10 to the chucks 16 in timed relation to the rotation of the drums 20 as controlled by the spaced openings in the discs 24. It will also be observed that the drum 20 is continuous in operation and that the chucks 16 are rotated by the gears 134 continuously as they roll around in mesh with the ring gear 136. It will also be apparent that the chucks 16 are further accelerated in their rotation by having the ring gear 136 driven in the opposite direction from that of the rotation of the drum 20, as clearly shown in Fig. 1.

In order to prepare the nuts for the sawing operation a stationary file or grinding member 160 is provided, as best shown in Figs. 4 and 6. As illustrated, the file 160 is supported by bolts 162 which extend through clearance holes in the stationary drum 104. Springs 164 are provided to fit over the bolts 162, between the file 160 and the drum 104 so that the file is permitted to yieldingly engage the nuts in the chucks 16 as they pass by. This filing operation serves the purpose of grinding away the hard, crusted outer surface of the shell so as to save the wear and tear on the saw and also insures a more uniform diameter of the nuts which is of great advantage when the sawing operation is performed, as will be described. A retaining member 165 secured to the drum 104 is provided to bear against the end of the file 160, to hold it in proper alignment and prevents the bolts 162 from binding in the clearance holes, when the pressure of the nuts against the file is applied.

Provision is made for sawing a groove around the periphery of the nut, and the groove may extend through the entire shell down to the kernel or be arranged to terminate close to the kernel to avoid injuring the same. For this purpose a circular saw 200 is provided which is arranged to be independently driven in a clockwise direction as shown by the arrow in Fig. 4. It will be observed that the nuts are also rotated on their axes in a clockwise direction so that when the nuts come in contact with the saw, the combined surface speed of the nut and the saw operate to result in a very high cutting speed which is very desirable to permit the machine to be operated at a maximum speed and with high efficiency.

As illustrated in Figs. 4 and 6, the saw 200 is clamped on the end of a shaft 202 by a nut 203. The shaft 202 is journalled in bearings 204, 206, and 208 in an offset lever 210, the latter being fulcrumed on a stud 212, fixed in a bracket 214. The shaft 202 is arranged to be driven by the motor 216 adjustably mounted on a base 224 through the belts 218 which run over a pulley 220, fast on the shaft 202 and a pulley 222 attached to the motor shaft. The offset lever 210 is supported at its upper end by an angle piece 226 fastened to the bracket 130. The angle piece 226 is provided with a compression spring 228 at the end thereof, one end of which rests against the lever 210 and the other end of which bears against a washer 230. A nut 232 is provided to adjust the position of the spring for the proper tension. As a result of this construction, the saw 200 is yieldingly held against the nuts as they pass by, and in order to further increase the pressure of the saw against the nuts, a second spring 234 is provided which has one end hooked in a stud 236 attached to the lever 210 and the other end adjustably secured to an upright channel 238 fastened to the machine frame.

Provision is made for adjustably limiting the depth of the cut or groove in the nut and, as illustrated herein, a guard 250 which follows the contour of the saw is arranged to bear against the nuts and thereby prevent the saw from cutting beyond a predetermined depth. The guard 250 is mounted on a bracket 249 for lateral adjustment toward and from the nuts in a groove 251 formed on the top of the bearing 208. A tongue 252 formed on the bracket 249 fits in the groove 251. In order to adjust the guard for different depths of cut an adjusting screw 254 is provided which fits into the tongue 252 of the bracket 249. The adjusting screw 254 is held from lateral displacement by a retaining member 256 secured to the hub 208 by screws 258. A groove in the hub of the screw 254 is arranged to fit into a slot cut in the retaining member 256. From the above description it will be apparent that by turning the handle 260 of the adjusting screw 254 the guard 250 can be adjusted laterally for the purpose described. In order to lock the guard in the adjusted position a locking member 262 is provided, as shown in Fig. 6, which is made to bear against one face of the tongue 252 by set screws 264 secured in a lug 266 on the hub 208. Thereafter, the bolts 268 may be tightened down to hold the locking member 262 in place. Elongated holes or slots are provided for the bolts 268 to allow the locking member 262 to be pressed against the face of the tongue 252 by the set screws 264.

In the operation of the machine, the grinding operation, as above described, prepares the nuts for most efficient sawing, enabling the sawing operation to be adjusted to form the cut extremely near to the kernel.

After the sawing operation has been performed, provision is made for removing the nuts from the chucks 16 and splitting them along the groove made by the saw. For this purpose a spider 300 is provided which carries a plurality of splitting mechanisms, indicated generally at 301. The spider 300 is keyed to a shaft 302 journalled in suitable bearings in supporting brackets 304 and 306. The shaft 302 is arranged to be driven by a chain 308 which runs over a sprocket 310 fast on the shaft 302 and a sprocket 312 fast on the shaft 52. The spider 300 is preferably driven in timed relation to the rotation of the chuck carrying drums 20, in such a manner that as each nut carried in the chucks 16 comes along, an individual splitting mechanism is presented thereto.

Referring now to Figs. 4, 5, 7 and 8, each splitting unit includes a set of splitting jaws 320 and 322. One pair of splitting jaws 320 is fulcrumed on shoulder studs 324 which are secured to the spider 300 by nuts 326. The other pair of splitting jaws 322 is fulcrumed on shoulder studs 328 which are secured to a double armed supporting lever 330 by nuts 331. The lever 330 is arranged to rock on fulcrum pins 332 which extend into bearings 334 on brackets 336. The brackets 336 are fastened to the spider 300 by bolts 338, as shown in Fig. 8. In their normal position, the faces of both pairs of splitting jaws 320 and 322 are adjacent to each other as seen in the upper position in Fig. 5 and operate together as a unit. Each splitting jaw has a countersunk portion 340 shaped to fit the contour of the nut. The thin section of metal 341 remaining below the countersunk portion is likewise cut to conform to the shape of the kernel or the bottom of the groove in the shell. The splitting jaws are arranged to be opened to receive a nut and, as herein illustrated, a cam 342 is provided which cooperates with cut out portions 344 in the splitting jaws 320. The cam 342 is fixed to one end of a stud 346 which extends through a hole in the spider 300. The other end of the stud 346 has fixed thereon a cam lever 348 which carries a cam roll 350 at its outer end. The cam roll 350 cooperates with a stationary closed cam 352 which fits loosely over the shaft 302 and is held in a stationary position by a bolt 354.

Each pair of gripping jaws 320 and 322 is provided with a compression spring 355, the ends of which fit into holes drilled in extensions 357 of the jaws 320 and 322. The spring 355 normally tends to urge the opposite jaws together when not acted upon by the cam 342. In order to release the nut from its gripped position in the chucks 16, to permit the transfer to the splitting jaws 320 and 322, stationary cams 356 and 358 are provided which cooperate with the cam rolls 112 on the levers 108 to spread the chucks 16 away from each other, as illustrated in Fig. 5. The stationary cams are mounted on top of the brackets 304 and 306, respectively.

From the above description it will be apparent that as the drum 20 rotates to advance the nuts in the chucks 16 toward the splitting mechanism, the splitting jaws 320 and 322 are opened to receive the nuts. It will be further observed that as the chucks and the jaws are further advanced, the splitting jaws close in around the nut and the chucks are spread apart to release the nut, thereby effecting the transfer from the chucks to the jaws. It will also be noted that when the splitting jaws are closed in around the nut the thin cut out sections 341 of the jaws fit into the groove in the nut and both pairs of jaws cooperate to support the nut. For the sake of clearness in illustration all the splitting jaws are not shown in Fig. 4, but it is to be understood that splitting jaws are provided all the way around the spider 300. Provision is made to spread the jaws 322 away from the jaws 320 in the direction indicated by the arrow in Fig. 8 in order to perform the splitting operation while the jaws are still in their closed position and in contact with the nut, as shown in Fig. 7. As above described, the pair of jaws 322 are secured to the lever 330 and, as illustrated in Figs. 5 and 8, a cam lever 360 is pivotally supported by the lever 330 on a stud 362. The cam lever carries a cam roll 364 at one end thereof which is arranged to cooperate with a stationary cam 366 fastened to the hub of the bracket 304. The cam roll 364 comes in contact with the cam 366 as the spider 300 rotates during the operation of the machine. A second arm or extension 368 on the cam lever 360 carries a pressure block 372, preferably comprising a piece of fibre, which is arranged to bear against the jaws 322 to prevent them from opening when the splitting operation is performed, as will be described.

Dowel pins 370 are provided in the ends of the jaws 320 and 322 and are arranged so that one end of the pins are fixed in the jaws 320, the other ends fitting loosely in clearance holes provided in the jaws 322. This arrangement insures that the two pairs of jaws will open and close together, and at the same time permits the jaws 322 to be spread apart from the jaws 320 to pry the shells off the kernel, as shown in Fig. 8.

From the description thus far, it will be observed that as the splitting unit advances in the direction shown by the arrow in Fig. 4, the cam roll 364 will come in contact with the stationary cam 366 and through the pressure applied by the pressure block 372 on the jaws 322 the lever 330 will turn on its fulcrum 332. The jaws are pivoted at their upper edges and are caused to spread apart and break away the shells from the kernel along the groove made by the saw. The pressure block 372 assists in holding the jaws in their gripping position around the nut and prevents the jaws from spreading apart under the influence of the prying action during the splitting operation.

Directly after the splitting operation is performed, the jaws are caused to open again to release the kernel and the removed shell. The cam roll 350 travelling in the path of the stationary cam 352 operates to turn the lever 348 in the spider 300 and thereby turn the opening cam 342 to open the jaws, as illustrated in Fig. 4. The released kernel and shells thereafter are permitted to fall through a chute 380 to a moving belt 400 on the delivery conveyor 401. The delivery conveyor, supported by brackets 402 on the underside of the platen of the framework of the machine, is arranged to be driven by a chain 404 which runs over a driving sprocket 406 fast on the shaft 58 and a sprocket 408 fast on a conveyor shaft 410. The conveyor is provided with a pulley 412 at one end fast on the shaft 410 and an idler pulley 414 at the other end over which the belt 400 runs.

From the description thus far it will be observed that the present machine operates to separate the kernels from the shells of the nuts in an automatic efficient manner, and while the preferred embodiment of the invention has been herein illustrated and described, it will be understood that the invention may be embodied in other forms within the scope of the following claims.

Having thus described the invention, what is claimed is:—

1. In a machine of the character described, in combination, a plurality of gripping members cooperating in pairs, means for revolubly supporting the gripping members, means for rotating the gripping members of each pair about their own axes, means for opening and closing the gripping members, means for feeding individual nuts to said gripping members, while the latter are opened, a grinding member disposed in the path of the nuts and adapted to reduce the shells of said nuts to a substantially uniform diameter, and a rotary saw succeeding the grinding member and adapted to saw a groove in the shells of said nuts as they are being carried by said rotating and revolving gripping members.

2. In a machine of the character described, in combination, a plurality of gripping members cooperating in pairs, means for revolubly supporting the gripping members, means for rotating the gripping members of each pair about their own axes, means for feeding individual nuts to said gripping members, a grinding member disposed in the path of the nuts and adapted to reduce the shells of said nuts to a substantially uniform diameter, a rotary saw succeeding the grinding members and adapted to saw a groove in the shells of said nuts as they are being carried by said rotating and revolving gripping members, and spreading means insertable into said groove for spreading apart the sections of the shell of the nut.

3. In a machine for opening the shells of nuts, in combination, nut holding means, means for moving the nut holding means, a grinding member to which successive nuts are presented by the nut holding means whereby to reduce the shells of the nuts to a substantially uniform diameter, and a cutting member to which the nuts are successively presented by the nut holding means.

4. In a machine for opening the shells of nuts, in combination, a grinding member for removing irregularities from the surface of a nut, reducing it to a substantially uniform diameter, a cutting member for cutting a slot in the shell of the nut, nut holding means, means for moving the nut holding means to present a nut first to the grinding member to perform the grinding operation and then to the cutting member to perform the cutting operation, and means for spreading apart the cut portions of the shell of the nut.

5. In a machine for opening the shells of nuts, in combination, a plurality of movable nut holding devices, means for moving the same, a grinding member disposed with relation to the path of movement of the nut holding devices whereby successive nuts are presented thereto to be reduced by the operation of the grinding member to a substantially uniform diameter, and a cutting member also disposed with relation to the movement of the nuts for thereafter cutting the shells of the nuts to facilitate the opening thereof.

6. A machine of the character described, having, in combination, means for storing a bulk supply of the nuts to be opened, a revoluble circular supporting member, means to revolve said supporting member, a plurality of pairs of gripping devices individually rotatably mounted upon said supporting member around the periphery thereof, means to rotate said pairs of gripping devices, nut grinding means disposed in the path of the nuts carried by said movable gripping devices and to which successive nuts are presented by said movable gripping devices, a circular saw succeeding the grinding means and to which successive nuts are presented by said movable gripping devices for cutting peripheral grooves in the shells of the nuts, and means for spreading apart the sections of the shells of the nuts.

7. A machine of the character described, having, in combination, means for storing a bulk supply of the nuts to be opened, a standard, a movable endless supporting member mounted upon said standard, means to move said supporting member, a plurality of pairs of gripping devices individually rotatably mounted upon said supporting member around the periphery thereof, a circular saw carried by the standard to which successive nuts are presented by said movable gripping devices for cutting a peripheral groove in the shells of the nuts substantially intermediate the ends thereof, and a rotatably mounted spreading assembly including pairs of spreader jaws, one jaw of each pair being hinged to cooperate with the other jaw of the pair, each jaw of each pair having nut groove engaging portions adapted to receive the nuts from the endless supporting member, and cam means for separating the jaws.

8. A method of shelling nuts such as Macadamia nuts comprising, removing irregularities about a circumference of the shell of the nut by a grinding operation, then grooving the shell circumferentially along the smooth ground portion, and finally spreading apart the two sections of shell to release the kernel.

SAMUEL B. FIELD.